United States Patent [19]

Boccuzzi

[11] Patent Number: 5,438,592
[45] Date of Patent: Aug. 1, 1995

[54] PI/4-DQPSK PHASE STATE ENCODER/DECODER

[75] Inventor: Joseph Boccuzzi, Brooklyn, N.Y.

[73] Assignee: AT&T Corp., Murray Hill, N.J.

[21] Appl. No.: 221,632

[22] Filed: Mar. 31, 1994

[51] Int. Cl.[6] .................. H04L 27/10; H04L 27/18
[52] U.S. Cl. .................... 375/283; 375/279
[58] Field of Search ................ 375/52, 56, 84, 85, 375/67; 332/103, 104; 329/304, 310

[56] References Cited

U.S. PATENT DOCUMENTS 3,336,578  8/1967  Kuflik et al. ................. 375/84
3,409,831  11/1968  Walker ........................... 375/52
5,077,757  12/1991  Cahill ............................ 375/59

Primary Examiner—Stephen Chin
Assistant Examiner—Huong Luu

[57] ABSTRACT

A $\pi/4$-DQPSK differential phase state encoder/decoder (Codec) is presented which can be implemented using a small number of logic gates. The phase state Codec acts upon data in the transmitter and in the receiver of a $\pi/4$-DQPSK modulating system whereby the use of a look-up table technique or other off-line procedure to ensure proper phase transitions is not required. The phase state Codec is configured to ensure compliance with the IS-54 standard as well as other similar standards.

4 Claims, 3 Drawing Sheets

PI/4-DQPSK PHASE STATE ENCODER/DECODER

BACKGROUND OF THE INVENTION

This invention relates to the modulation of binary data using $\pi/4$-DQPSK (Differential Quadrature Phase Shift Keying). In particular, this invention provides a real time encode/decode (Codec) operation which acts on message binary data to ensure that particular phase states can be achieved which are consistent with the "Cellular System Dual-Mode, Mobile Station-Base Station Compatibility Standard" IS-54 or any other similar standard.

THE PRIOR ART

It is usually necessary to employ a modulation technique in order to transmit data of different forms or from different sources over the same channel, whether the channel is a conductive medium, free air or an optical fiber. $\pi/4$-DQPSK modulation is a prior art technique which is an extension of Phase Shift Keying (PSK) modulation. In PSK modulation, the phase $\Theta(t)$ of the carrier waveform $A(t) \cdot \cos(W_o t + \Theta(t))$, abruptly changes by $\pi$ whenever the data changes logic levels. Thus $\Theta(t)$ can be one of two discrete states; 0 or $\Theta$. When $\pi/4$-DQPSK modulation is used, the phase $\Theta(t)$ of the carrier waveform $A(t) \cdot \cos(W_o t + \Theta(t))$ can change by $\pm \pi/4$ or $\pm 3\pi/4$. FIG. 1 shows the $\pi/4$-DQPSK carrier signal phase constellation indicating possible phase transitions between states.

FIG. 2 shows a block diagram of a prior art $\pi/4$-DQPSK transmitter which illustrates the process by which the data, in the form of a serial binary bit stream, is mapped to the discrete phase states of the composite carrier waveform shown in FIG. 1. The serial binary bit stream is first converted into two bit streams Xk and Yk using a serial to parallel converter 2. A bit pair is defined herein to be one bit from each of two channels, in phase Ik and quadrature Qk, defined below at instant k. These bit pairs are sometimes called data symbols or data samples. The logic waveforms describing a serial to parallel converter are shown in FIG. 3. Xk and Yk are then converted into two new bit streams Ik and Qk using a differential mapping transfer function 4. This step is necessary because in differential modulation, the current data sample must be represented with respect to the previous data sample. The transfer functions of differential mapping are well known in the art to be $$Ik = X(k) \cdot I(k-1) - Y(k) \cdot Q(k-1)$$

$$Qk = X(k) \cdot Q(k-1) + Y(k) \cdot I(k-1)$$

Ik and Qk are called quadrature component signals. Ik and Qk then enter low pass filters (LPF) 12 and 14 respectively which limit their spectral content and produce filtered quadrature component signals Ikf and Qkf. Ikf and Qkf then enter a quadrature modulator 5 which performs the function of shifting the frequency spectrum of Ikf and Qkf to $W_o$ and then summing the two signals to form the composite carrier waveform $A(t) \cdot \cos(W_o t + \Theta(t))$, where the change in $\Theta(t)$ is mapped according to Table 1. Thus, as Xk and Yk change, the phase $\Theta(t)$ of the composite carrier waveform will change by $\pm \pi/4$ or $\pm \pi/3\pi/4$ and the discrete values of $\Theta(t)$ will match those shown in FIG. 1. The Ik channel is often called the In-Phase channel and the Qk channel is often called the Quadrature channel because $Ik \cdot B \cdot \cos(W_o t)$ and $Qk \cdot C \cdot \sin(W_o t)$ are orthogonal signals.

TABLE 1

Phase State Table of a Typical $\pi/4$-DQPSK Modulator

| Xk | Yk | phase state changes |
|----|----|---|
| 0 | 0 | $-3\pi/4$ |
| 0 | 1 | $3\pi/4$ |
| 1 | 0 | $-\pi/4$ |
| 1 | 1 | $\pi/4$ |

In some communication systems which employ particular standards, the phase state changes shown in Table 1 are not allowed, and additional steps are required in the modulation and demodulation process to ensure compliance. For example, U.S. Pat. No. 5,260,673 teaches a complex look-up table technique to map phase state transitions. The standard which the preferred embodiment of this invention addresses is IS-54, which is employed by the North American Digital Cellular (NADC) system. IS-54 has adopted the specific allowable phase state changes for $\pi/4$-DQPSK modulation shown in Table 2.

TABLE 2

IS-54 Phase State Table

| Xk | Yk | phase state changes |
|----|----|---|
| 0 | 0 | $\pi/4$ |
| 0 | 1 | $3\pi/4$ |
| 1 | 0 | $-\pi/4$ |
| 1 | 1 | $-3\pi/4$ |

Since a typical $\pi/4$-DQPSK modulator will not match the phase state changes shown in Table 2, it was heretofore necessary to incorporate a look-up table technique or other off-line operation to ensure compliance with IS-54. The invention is not limited to being used with systems employing IS-54, as the invention may well achieve compliance with other standards which have adopted the phase state definitions of Table 2.

This invention overcomes the less efficient, costly and complex look-up table technique or equally undesirable off-line procedures of the prior art needed to comply with the discrete phase transitions of a $\pi/4$-DQPSK modulator defined by IS-54 or other similar standard.

SUMMARY OF THE INVENTION

The present invention is a $\pi/4$-DQPSK phase state encoder/decoder (Codec) which consists of a four terminal electronic circuit comprising two inverters which act on binary data in a way which produces the phase states defined by IS-54, or other similar standards, when modulated or demodulated using $\pi/4$-DQPSK.

DESCRIPTION OF THE FIGS

The invention can be better understood when considered with the following drawings where:

DETAILED DESCRIPTION OF THE PREFERRED EMBODIMENT

Figure 1:
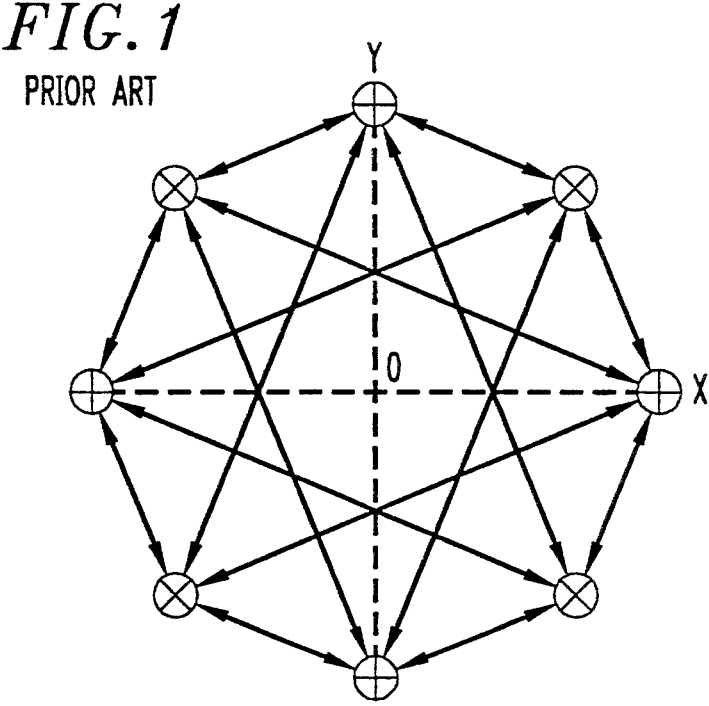
FIG. 1 is a constellation of the phase states and phase transitions of a $\pi/4$-DQPSK carrier waveform of the prior art.
Figure 2:
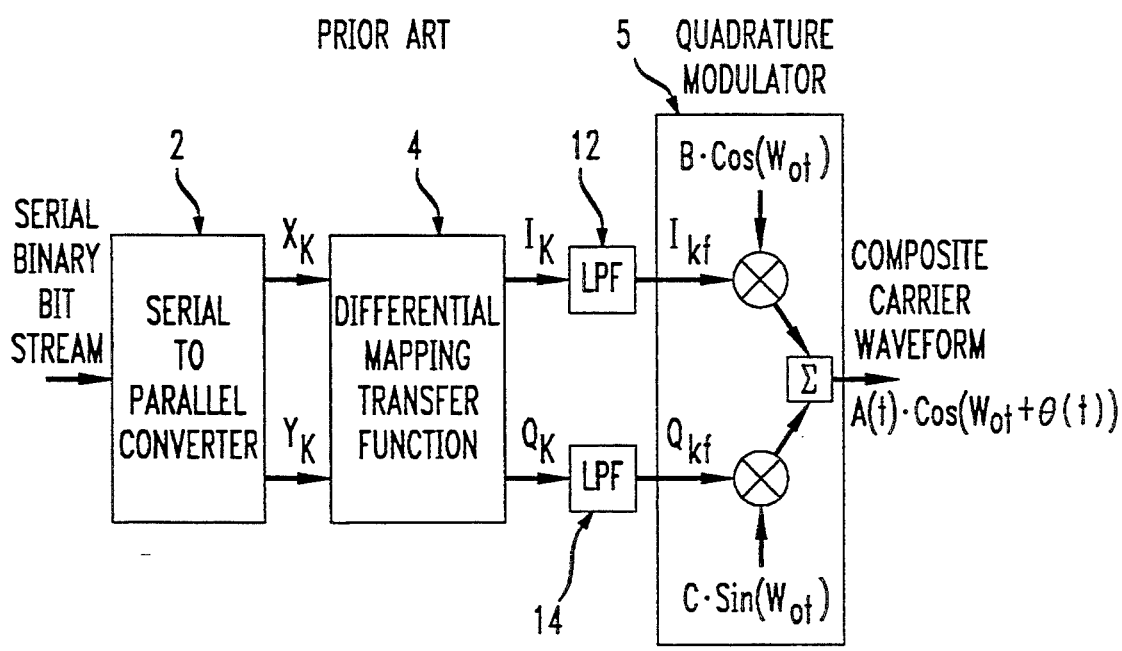
FIG. 2 is a block diagram of a typical $\pi/4$-DQPSK transmitter of the prior art.
Figure 3:
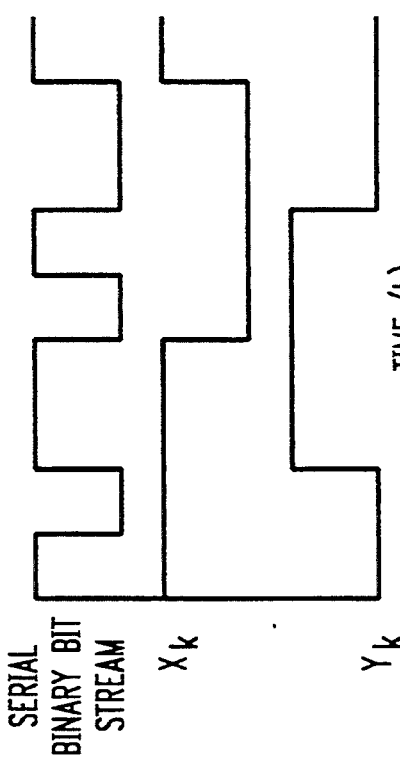
FIG. 3 is a graphical representation of the transfer function of a serial to parallel converter of the prior art.
Figure 4:
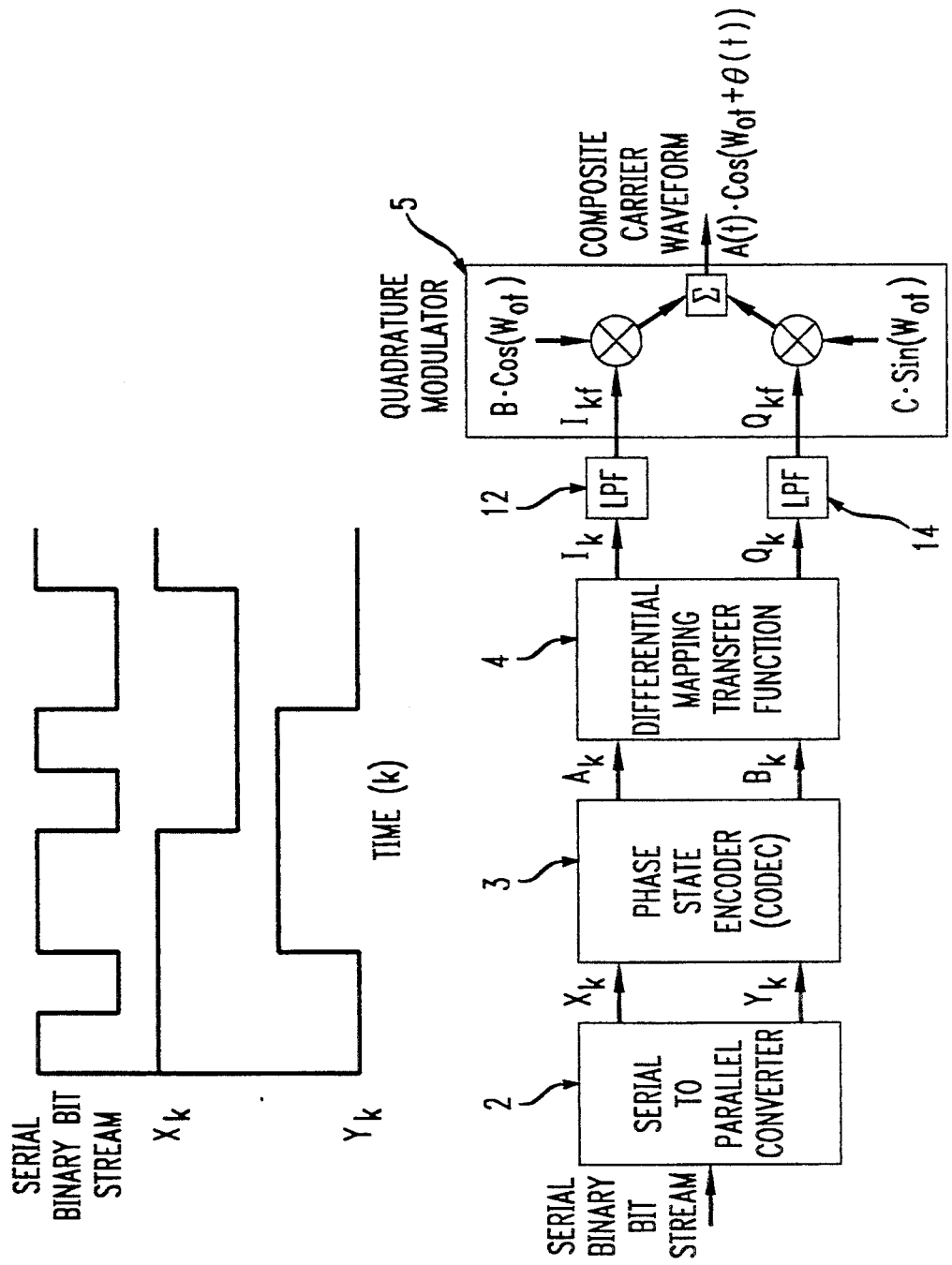
FIG. 4 is a block diagram of a π/4-DQPSK transmitter employing the phase state encoder of the preferred embodiment of the present invention.

Reference is now made to FIG. 4, which shows a block diagram of a π/4-DQPSK transmitter employing the preferred embodiment of the invention. The addition of the phase state encoder 3 produces two new bit streams Ak and Bk which ensure compliance with a system standard such as IS-54 defined, in part, by Table 2.

Figure 5:
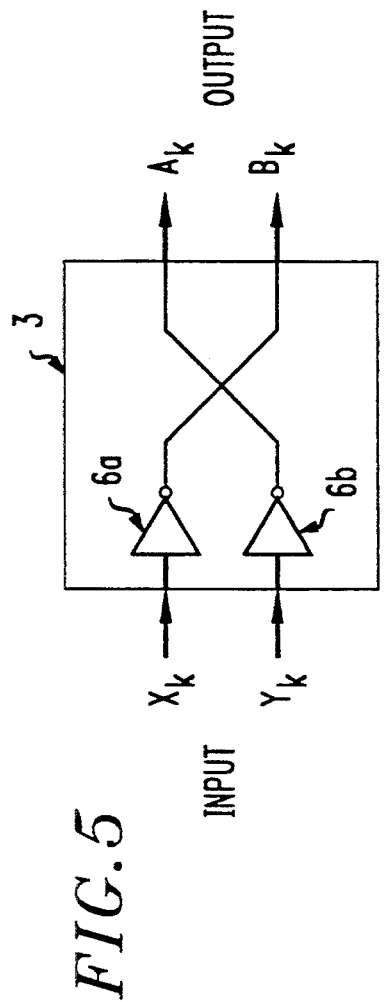
FIG. 5 is a hardware implementation of the phase state encoder of the preferred embodiment of the present invention.

FIG. 5 shows a hardware implementation of the phase state encoder 3 which is comprised of two hardware logic inverters 6a and 6b. Xk and Yk are inputs to the π/4-DQPSK Codec 3 and Ak and Bk are outputs. Xk is input to a first logic inverter 6a from which Bk is the output. Yk is input to a second logic inverter 6b from which Ak is the output. Connections are made to the inverters using a conductive medium such that the following truth table results:

TABLE 3

| Codec Truth Table | | | |
|---|---|---|---|
| Xk | Yk | Ak | Bk |
| 0 | 0 | 1 | 1 |
| 0 | 1 | 0 | 1 |
| 1 | 0 | 1 | 0 |
| 1 | 1 | 0 | 0 |

Thus, in accordance with this invention, the mapped phase state changes will match those shown in Table 2 which differ from those in Table 1 when (Xk,Yk)=(0,0) or (1,1).

Figure 6:
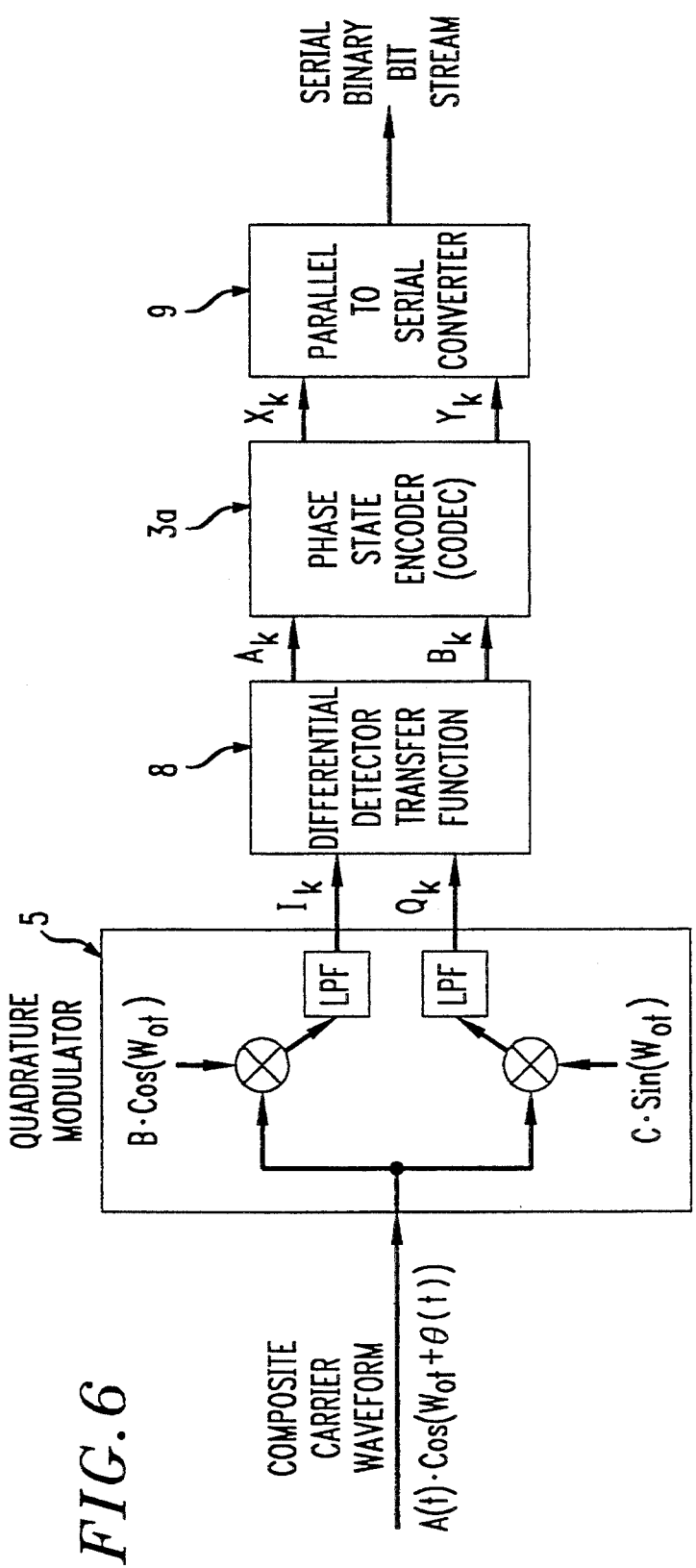
FIG. 6 is a block diagram of a π/4-DQPSK receiver employing the phase state decoder of the preferred embodiment of the present invention.

Since the data streams of Ak and Bk are encoded forms of Xk and Yk, it is necessary to decode the received Ak and Bk bit streams in order to accurately reproduce the original Xk and Yk bit streams. FIG. 6 shows a block diagram of a π/4-DQPSK receiver employing a phase state decoder 3a of the preferred embodiment. The quadrature detector 7 recovers Ik and Qk from the transmitted composite carrier waveform $A(t) \cdot \cos(W_o t + \Theta(t))$. The function of the differential detector transfer function 8 in the receiver is well known in the art to reverse the process of the differential mapping transfer function, which was accomplished in the transmitter, and convert the demodulated quadrature component signals Ik and Qk into the Ak and Bk bit streams. The differential detector transfer functions are defined as follows:

$$A(k) = I(k) \cdot I(k-1) + Q(k) \cdot Q(k-1)$$

$$B(k) = Q(k) \cdot I(k-1) - I(K) \cdot Q(k-1)$$

The phase state decoder 3a transforms Ak and Bk into the original Xk and Yk bit streams. The implementation of the preferred embodiment of the phase state decoder is the same as the phase state encoder shown in FIG. 5, where the inputs are now Ak and Bk and the outputs are Xk and Yk. The same configuration of the Codec will produce the desired result whether resident in the transmitter or the receiver. The entire system, in accordance with this invention, now conforms to the phase state transitions defined by IS-54. A parallel to serial converter 9 then completes the receiving process by reproducing the original serial binary bit stream. It is noted that the invention is not limited to being used solely in systems required to meet IS-54.

The Codec has the advantage of being relatively simple to implement in hardware and thus has no significant impact on recurring manufacturing costs or availability of circuit board surface area. Because the encoding and decoding Codecs have the same configuration, the design process is straightforward and the desirable quality of design re-use is inherent therein. Additionally, a hardware implementation of the phase state Codec performs its function in real time and thus does not require costly processing time and does not significantly delay the transmission of the message data or the received signals.

The foregoing description of the preferred embodiment of the invention has been presented for the purposes of illustration and description. It is not intended to be exhaustive or to limit the invention to the precise form disclosed. Modifications and variations are possible in light of the above teaching. It is intended that the scope of the invention be not limited by this detailed description, but rather by the claims appended hereto.

I claim:

1. A π/4-Differential Quadrature Phase Shift Keying (π/4-DQPSK) phase state encoder/decoder (Codec) for use with a multiplying and summing quadrature modulator/demodulator, said Codec comprising a first logic inverter, wherein a first input signal is inverted by said first logic inverter to produce a second output signal, a second logic inverter, wherein a second input signal is inverted by said second logic inverter to produce a first output signal, and interconnecting means between said first and second logic inverters for providing phase state changes of said multiplying and summing quadrature modulator/demodulator that result in the following table:

| first input signal | second input signal | phase state changes |
|---|---|---|
| 0 | 0 | π/4 |
| 0 | 1 | 3π/4 |
| 1 | 0 | −π/4 |
| 1 | 1 | −3π/4. |

2. An improvement in a π/4-Differential Quadrature Phase Shift Keying (π/4-DQPSK) transmitter for modulating a carrier waveform with binary data prior to transmission over a channel, wherein said transmitter comprises serial to parallel converter means to convert serial binary data into first and second bit streams, differential mapping transfer function means for providing an output data symbol as a function of a previous output data symbol, said differential mapping transfer function having said previous output data symbol and a third and fourth bit stream as input signals for producing said output data symbol in the form of first and second quadrature component signals, low pass filter means for limiting the frequency spectrum of said quadrature component signals producing filtered quadrature component signals, and quadrature modulator means for shifting the frequency of said filtered quadrature component signals and summing the shifted and filtered quadrature component signals to form a composite carrier waveform for transmission over said channel; the improvement comprising phase state encoder means for encoding said first and second bit streams and producing said third and fourth bit streams, said phase state encoder means comprising a first logic inverter, wherein said first bit stream is inverted by said first logic inverter prior to said differential mapping transfer function means to produce said fourth bit stream, a second logic inverter, wherein said second bit stream is inverted by said second logic inverter prior to said differential mapping transfer function means to produce said third bit stream, and interconnecting means between said first and second logic inverters for providing phase state changes of said transmitter that result in the following table:

| first bit stream | second bit stream | phase state changes |
|---|---|---|
| 0 | 0 | $\pi/4$ |
| 0 | 1 | $3\pi/4$ |
| 1 | 0 | $-\pi/4$ |
| 1 | 1 | $-3\pi/4$. |

3. An improvement in a $\pi/4$-Differential Quadrature Phase Shift Keying ($\pi/4$-DQPSK) receiver for demodulating a composite carrier waveform which has been transmitted over a channel, wherein said receiver comprises a quadrature demodulator means for shifting the frequency spectrum of said composite carrier waveform to baseband and producing first and second quadrature component signals, differential detector transfer function means for producing first and second bit streams from said first and second quadrature component signals, and parallel to serial converter means for converting third and fourth bit streams into a serial bit stream; the improvement comprising phase state decoder means for decoding said first and second bit streams and producing said fourth and third bit streams, respectively, said phase state decoder means comprising a first logic inverter, wherein said first bit stream is inverted by said first logic inverter prior to said parallel to serial converter means to produce said fourth bit stream, a second logic inverter, wherein said second bit stream is inverted by said second logic inverter prior to said parallel to serial converter means to produce said third bit stream, and interconnecting means between said first and second logic inverters for providing phase state changes of said receiver that result in the following table:

| third bit stream | fourth bit stream | phase state changes |
|---|---|---|
| 0 | 0 | $\pi/4$ |
| 0 | 1 | $3\pi/4$ |
| 1 | 0 | $-\pi/4$ |
| 1 | 1 | $-3\pi/4$. |

4. An improvement in a $\pi/4$-Differential Quadrature Phase Shift Keying ($\pi/4$-DQPSK) transmitter/receiver system for modulating a carrier waveform with binary data prior to transmission over a channel and for demodulating a received composite carrier waveform which has been transmitted over said channel, comprising a transmitter comprising serial to parallel converter means to convert serial binary data into first and second bit streams, differential mapping transfer function means for providing an output data symbol as a function of a previous output data symbol, said differential mapping transfer function having said previous output data symbol and third and fourth bit streams as input signals for producing said output data symbol in the form of first and second quadrature component signals, low pass filter means for limiting the frequency spectrum of said first and second quadrature component signals producing filtered quadrature component signals, and quadrature modulator means for shifting the frequency of said filtered quadrature component signals and summing the shifted and filtered quadrature component signals to form a composite carrier waveform for transmission over said channel; the improvement comprising phase state encoder means for encoding said first and second bit streams and producing said fourth and third bit streams, respectively, said phase state encoder means comprising a first logic inverter, wherein said first bit stream is inverted by said first logic inverter prior to said differential mapping transfer function means to produce said fourth bit stream, a second logic inverter, wherein said second bit stream is inverted by said second logic inverter prior to said differential mapping transfer function means to produce said third bit stream, and interconnecting means between said first and second logic inverters for providing phase state changes of said transmitter that result in the following table:

| first bit stream | second bit stream | phase state changes |
|---|---|---|
| 0 | 0 | $\pi/4$ |
| 0 | 1 | $3\pi/4$ |
| 1 | 0 | $-\pi/4$ |
| 1 | 1 | $-3\pi/4$, | said transmitter/receiver system further comprising a receiver comprising quadrature demodulator means for shifting the frequency spectrum of said received composite carrier waveform to baseband and producing third and fourth quadrature component signals, differential detector transfer function means for producing fifth and sixth bit streams from said third and fourth quadrature component signals, and parallel to serial converter means for converting seventh and eighth bit streams into a serial bit stream; the improvement further comprising phase state decoder means for decoding said fifth and sixth bit streams and producing said eighth and seventh bit streams, respectively, said phase state decoder means comprising a third logic inverter, wherein said fifth bit stream is inverted by said third logic inverter prior to said parallel to serial converter means to produce said eighth bit stream, a fourth logic inverter, wherein said sixth bit stream is inverted by said fourth logic inverter prior to said parallel to serial converter means to produce said seventh bit stream, and interconnecting means between said first and second logic inverters for providing phase state changes of said receiver that result in the following table:

| seventh bit stream | eighth bit stream | phase state changes |
|---|---|---|
| 0 | 0 | $\pi/4$ |
| 0 | 1 | $3\pi/4$ |
| 1 | 0 | $-\pi/4$ |
| 1 | 1 | $-3\pi/4.$ |

* * * * *